Jan. 29, 1963 G. P. PATRIQUIN ET AL 3,075,797
KNOB RETENTION ASSEMBLY
Filed Sept. 15, 1960 3 Sheets-Sheet 1
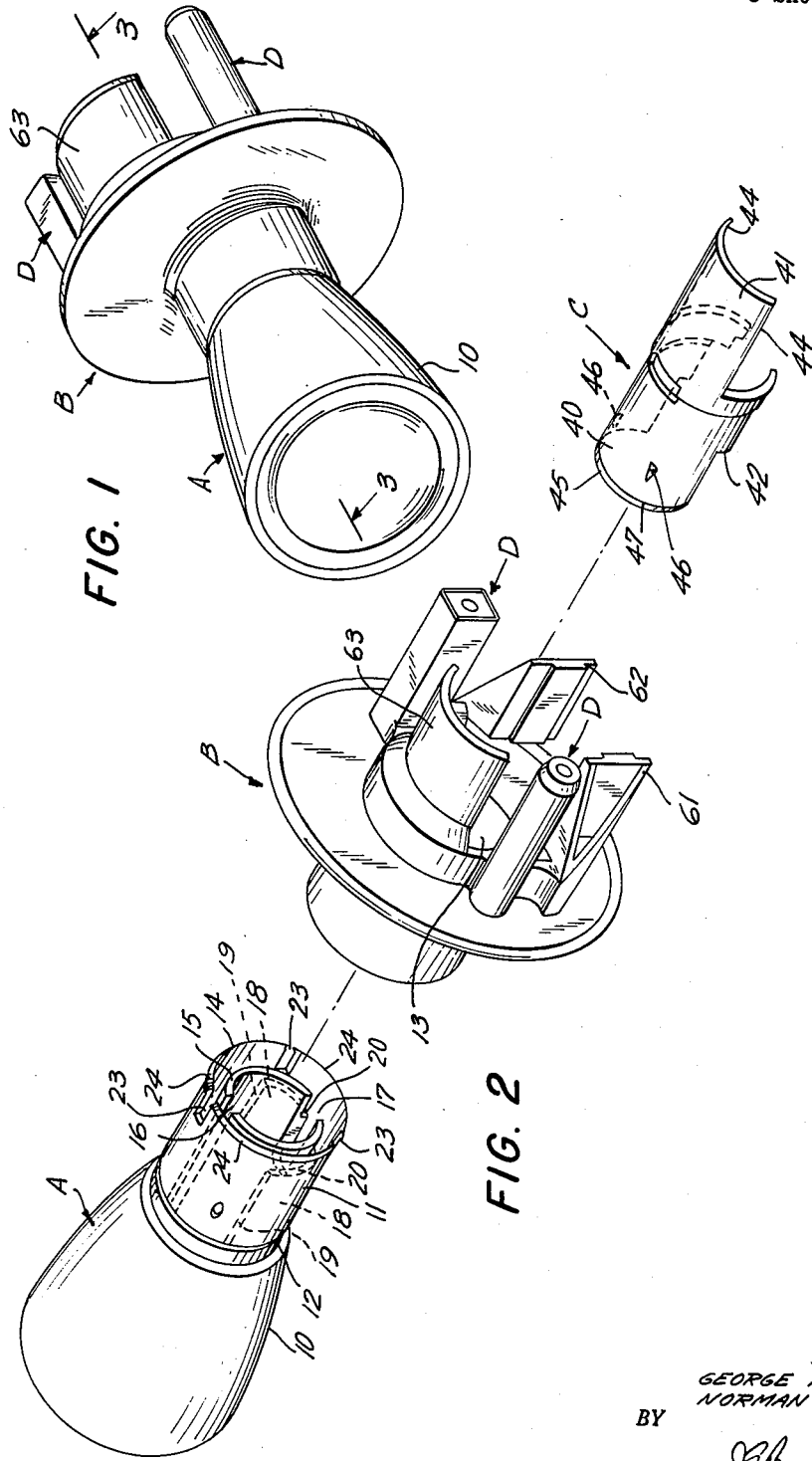
INVENTORS
GEORGE P. PATRIQUIN
NORMAN R. ADLER
BY
their ATTORNEY Jan. 29, 1963

G. P. PATRIQUIN ET AL 3,075,797

KNOB RETENTION ASSEMBLY

Filed Sept. 15, 1960

INVENTORS
GEORGE P. PATRIQUIN
NORMAN R. ADLER

BY
J. G. Basseches
their ATTORNEY

Jan. 29, 1963    G. P. PATRIQUIN ET AL    3,075,797
KNOB RETENTION ASSEMBLY
Filed Sept. 15, 1960    3 Sheets-Sheet 3

INVENTORS
GEORGE P. PATRIQUIN
NORMAN R. ADLER
BY
J. H. Basseches
their ATTORNEY

# United States Patent Office 3,075,797
Patented Jan. 29, 1963

3,075,797
KNOB RETENTION ASSEMBLY
George P. Patriquin, Gardener, and Norman R. Adler, Fitchburg, Mass., assignors to Independent Lock Company, Fitchburg, Mass., a corporation of Massachusetts
Filed Sept. 15, 1960, Ser. No. 56,235
19 Claims. (Cl. 292—336.3)

This invention relates to a latch bolt retractor assembly and more particularly to a latch bolt actuating assembly comprising a knob and shank, a supporting rose structure and a retractor member, said parts including novel means permitting facile and permanent inter-connection thereof.

Still more particularly this invention relates to a latch bolt retractor structure and method of assembling the same, said retractor structure having novel inter-fitting relationship which permits integration of the parts in a fraction of the time heretofore required in the assembly of latch bolt retractor units previously known.

Still more particularly this invention relates to a cylindrical type latch bolt actuator unit wherein a plurality of the parts may be fabricated of plastic material, the novel construction of such mechanism permitting a permanence and ruggedness heretofore found only where metal parts exclusively were utilized.

Accordingly, it is an object of this invention to provide a latch bolt actuator assembly of simplified construction, which may be quickly and permanently assembled.

It is a further object of this invention to provide a latch bolt retractor of the class described, having a minimum number of component parts, which parts may be permanently assembled without the necessity of bending, swaging, welding, riveting, punching, staking or spinning operations heretofore required to be performed in the assembly of cylindrical latch bolt actuator mechanisms.

Still a further object of this invention is to provide a novel method for assembling latch bolt actuator mechanism.

Still a further object of this invention is to provide mechanism as above described wherein the majority of the component parts may be molded of plastic material or the like, yet which, in assembled condition, is sufficiently rugged and permanent as to provide in all respects a satisfactory or even superior and economical substitute for metal latch bolt actuator assemblies heretofore known.

To attain these objects and such further objects as may appear herein or be hereinafter pointed out, reference is made to the accompanying drawings forming a part hereof, in which—

FIGURE 1 is an isometric view of the latch bolt actuator assembly prior to mounting on the door;

FIGURE 2 is an isometric pre-assembly view showing the parts of the actuator mechanism prior to assembly;

Figure 3:
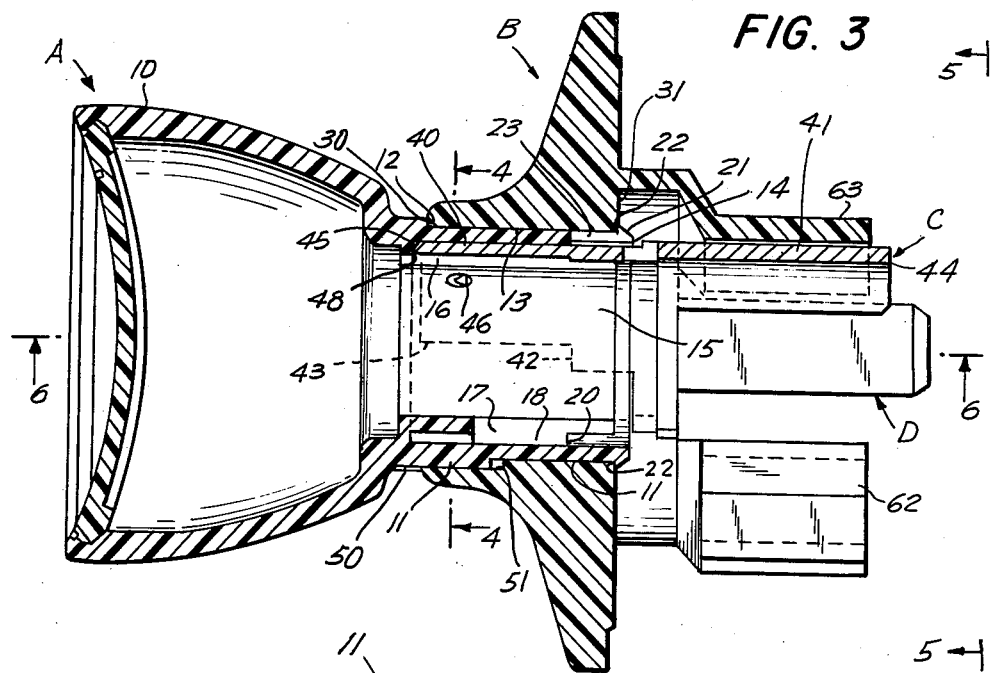
FIGURE 3 is a magnified section taken on the line 3—3 of FIGURE 1.

In accordance with our invention, the actuator assembly comprises three main members—specifically, the knob and shank component A, the supporting rose structure B and the latch bolt actuator member C.

The knob and shank assembly A which, in the illustrated embodiment, is formed integrally of plastic material, comprises a knob or grasping portion 10, a hollow tubular shank portion 11, the aforesaid parts being separated by an annular shoulder portion 12. The rose and support structure B, which amy likewise be molded integrally of resilient plastic or the like, is provided with an axial central bearing 13. The shank of the knob assembly A may be extended through the bearing 13 by radially compressing the leading portion 14 of the shank, said portion springing radially outwardly when passed entirely through the bearing 13, to provide a temporary retained connection between the knob assembly A and the rose assembly B. At this juncture of the assembling process, a strong pulling force exerted on the knob A might be sufficient to unseat the said knob and remove the same from the rose assembly B, since pulling on the knob A would tend to flex the leading edge portions 14 radially inward, thus permitting the shank 11 to pass back rearwardly through the bearing aperture 13 in the rose B.

Permanent assembly of the knob portion A and rose portion B is effected by securing the latch bolt retractor portion C to the shank 11 of component A, after the latter has been temporarily secured, as aforesaid, within the bearing 13 of the rose.

As will be more apparent from the ensuing detailed description, the retractor portion C thus serves a double function of providing the usual latch bolt actuating connection between knob and latch bolt member and the further novel function of reinforcing or rigidifying the radially expanded leading edge portion 14 of the shank 11 so as to prevent any inward radial movement of the same, thereby securing the shank 11 of the knob within the bearing aperture 13 of the rose against removal therefrom under pulling or separating influences exerted on the knob A which would tend to cause the leading edge portion 14 of the knob shank 11 to shift radially inward but for the stiffening, radial reinforcement provided by portions of the retractor C.

The tubular knob shank 11 is provided with a concentric inner tubular member 15, which member 15 is longitudinally slotted at 16 and 17 to provide a more resilient structure, as well as to accommodate portions of the operating mechanism not germane to an understanding of the present invention.

The annular space defined between the tubular member 15 and the shank 11 is partly filled by the arcuate webs or segments 18, 18, which webs or segments provide upper faces 19, 19 and forwardly or inwardly directed faces 20, 20, see FIGURE 2.

Figure 6:
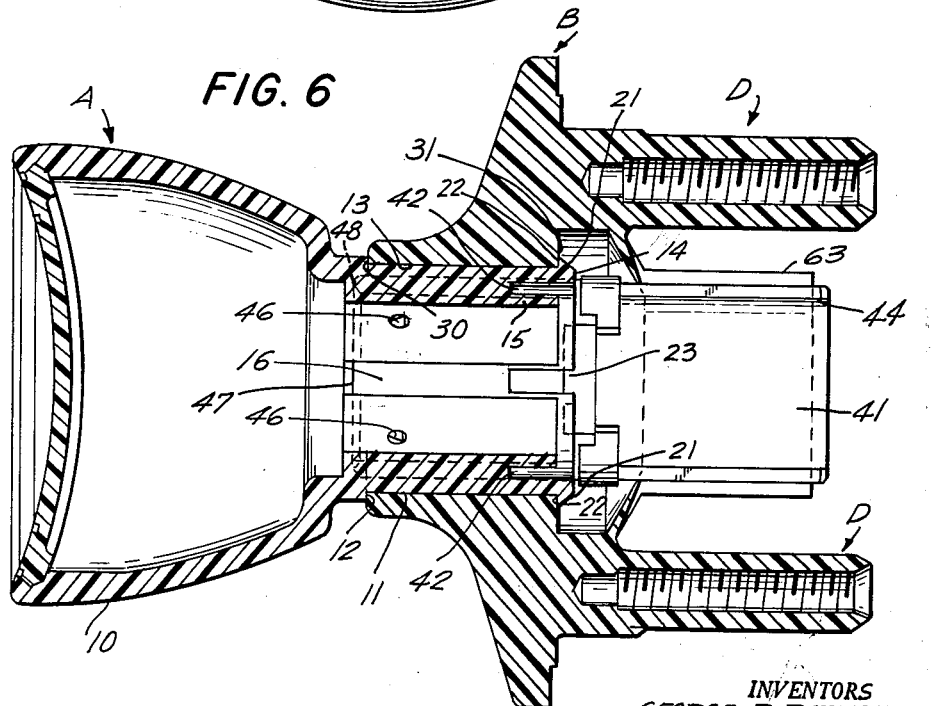
FIGURE 6 is a horizontal section taken on the line 6—6 of FIGURE 3.

As best seen in FIGURES 3 and 6, the leading edge 14 of the shank 11 is provided with an outwardly sloping cam portion 21, said cam portion 21 terminating in a rearwardly directed retaining shoulder 22. The tubular shank 11 is provided with a number of longitudinally extending slots 23, 23, 23, three in number being exemplified, each of said slots intersecting the leading edge 14, rendering said tubular shank at said leading edge portion increasingly resilient to be compressible in a radial direction and dividing the shank at the leading edge portion essentially into three retaining lugs 24, 24, 24, comprising arcuate segments of said shank separated by said slots 23.

The axial bearing 13 of the supporting rose structure B extends, as best seen in FIGURES 3 and 6, between the outer shoulder 30 defined by said rose and an inwardly facing annular shoulder 31 located within said rose assembly B. The supporting rose structure is provided with draw bolt receiver portions D, as more fully described in the copending application Serial No. 828,530, depicting the function of the said draw bolt receiver members to form the anchoring points for draw bolts (not shown) which extend toward and into said receiver members D from a complemental retractor actuator assembly (not shown), it being understood that a completed passage latch bolt retractor assembly in the usual fashion comprises a pair of retractor assemblies similar to the one herein illustrated, each secured against an opposite face of the door and retained in the usual transverse boring formed through the door by draw bolts extending from one retractor member into the retractor receivers D aforesaid. It will be understood that for a closet door, a single assembly may be employed.

The first phase of assembly of the retractor device is effected by forcing the shank 11 of the knob component A axially into the bearing 13 of the rose B. It will be readily recognized that such insertion is facilitated by the cam surfaces 21 formed on the leading edges of the retainer lugs or segments 24, said cam surfaces co-acting with the shoulder portion 30 to shift the lugs radially inwardly upon said axial insertion. When the leading edge portion 14 of the knob shank 11 has passed entirely through said axial bearing member 13, the resilience of the plastic shank member 11 will cause the segments or retaining lugs 24 to shift radially outwardly into a position at which the rear faces 22 of said lugs engage the annular shoulder 31 surrounding the inner end of the bearing 13. When thus assembled to the rose, end thrust in an inward direction against the knob A is absorbed by the adjacent shoulders 12 of the knob and the shoulder 30 of the rose. While the engagement of the shoulder 22 of the retaining lugs or segments 24 is sufficient to maintain the knob and shank in assembled condition on the rose B, the exertion of a pulling force against the knob of a magnitude which may occasionally be encountered in normal door operating usage might be sufficient to unseat the lugs 24 from their engagement with the shoulder 31 by causing a radial inward movement of the said lugs or segments. We have found that by integrating the retractor member C within the tubular shank 11 of the knob component A subsequent to the uniting of the knob A to the rose B, as heretofore described, a reinforcement effect may be achieved, which effect is sufficient to prevent the knob component A from being removed from the rose assembly B under any normal door operating forces which may be encountered.

The retractor component C is of parti-cylindrical construction and includes an open tubular section 40 and a trailing tubular section 41, of slightly larger diameter than the section 40. The tubular section 40, which is of a diameter and thickness to correspond exactly with the tubular space defined between the shank 11 and the inner tubular portion 15 of the knob component A, is provided with a pair of outwardly directed abutment shoulders 42, 42, said portion 40 including longitudinally extending shoulders 43, 43. The inwardly positioned parti-tubular section 41 likewise is provided with a pair of latch bolt actuator shoulders 44, 44, one of which shoulders co-acts with the latch bolt actuator assembly to withdraw the latch bolt when the said retractor member C is turned about its central axis. The interaction of the shoulders 44 with the latch bolt retractor assembly (not shown) will be fully understood by reference to the copending application Serial No. 828,530 aforesaid. While the latch bolt assembly described in the aforesaid application is known to those skilled in the art as a "push type" latch bolt assembly, the construction of the retractor portions of this device may be modified in a manner which will be appreciated by those skilled in the art, to make the same adaptable for use with a "pull" or "draw" type latch bolt assembly.

The assembly of the latch bolt actuator mechanism is completed by securing the retractor component C within the shank 11 of the knob component A, after the knob component has been secured within the rose assembly B in the manner described above. Such securing is effected by inserting the parti-tubular portion 40 into the space within the knob shank defined between the tubular portions 11 and 15, in which position longitudinally extending shoulders 43, 43 of the retractor component C will lie against the shoulders 19, 19 formed in the aforesaid tubular space. Assembly of the components A and C is facilitated by the chamfer 45 formed on the leading edge of the tubular section 40. The retractor member C is permanently secured within the component A by the inwardly directed darts or spurs 46, 46 which are struck from the parti-tubular portion 40 of the said retractor component C and which, in the fully inserted position within the knob component A, lie within the apertures 46', 46' formed within the inner tubular segment 15 of the knob component A (see FIGURE 4).

The spurs or darts 46, 46 are located in trailing position with respect to the direction of insertion of the tubular portion 40 into the shank 11 of the knob A and engage the leading or inner portions of the complemental apertures 46', 46', thereby positively uniting the components A and C.

The said uniting operation is accompanied by temporary distortion of portions of the inner segments 15 of the knob shank as the spurs are passed inwardly axially within the space defined between the knob shank segments 11 and 15. However, it will be readily recognized that the resilient plastic quickly recovers from the temporarily deformed condition to its initial dimension. Moreover, since the spurs act only to deform the inner tubular segment 15, any residual deformation will obviously have no effect upon the bearing provided between the outer periphery of the tubular section 11 and the bearing aperture 13 of the rose assembly. In said inserted or assembled position of the components A and C, the leading edge 47 of the tubular section 40 abuts the shoulder 48 formed adjacent the knob 10 and the shoulders 42, 42 abut the leading shoulders 20, 20 defined by segments 18, thus positively locating the component C axially with respect to the knob component A.

Similarly, torque driving connection is provided by the engagement of the shoulders 43, 43 of the component C with the shoulders 19, 19 of the knob component A.

While the spur members 46, 46 have been described in the illustrated embodiment as engaged within the apertures 46', 46' of the knob shank segment, it has been determined that a satisfactory integration of the knob A and the retractor component C may be achieved without resorting to the use of such apertures and depending instead upon a connection provided by distortion of the plastic portions of the knob shank which are engaged by the aforesaid spurs or darts 46.

While the knob component A may be made of a wide variety of materials, it has been found that nylon plastic may be advantageously employed for this purpose. As an example of a preferred nylon plastic, reference is made to Zytel 101, which is a polymeric amide resin or the resin formed by reacting adipic acid with hexamethylenediamine, as more fully described in the publication entitled "Zytel Nylon Resin," copyright 1956, by E. I. du Pont de Nemours & Co., Inc., page 9.

Figure 4:
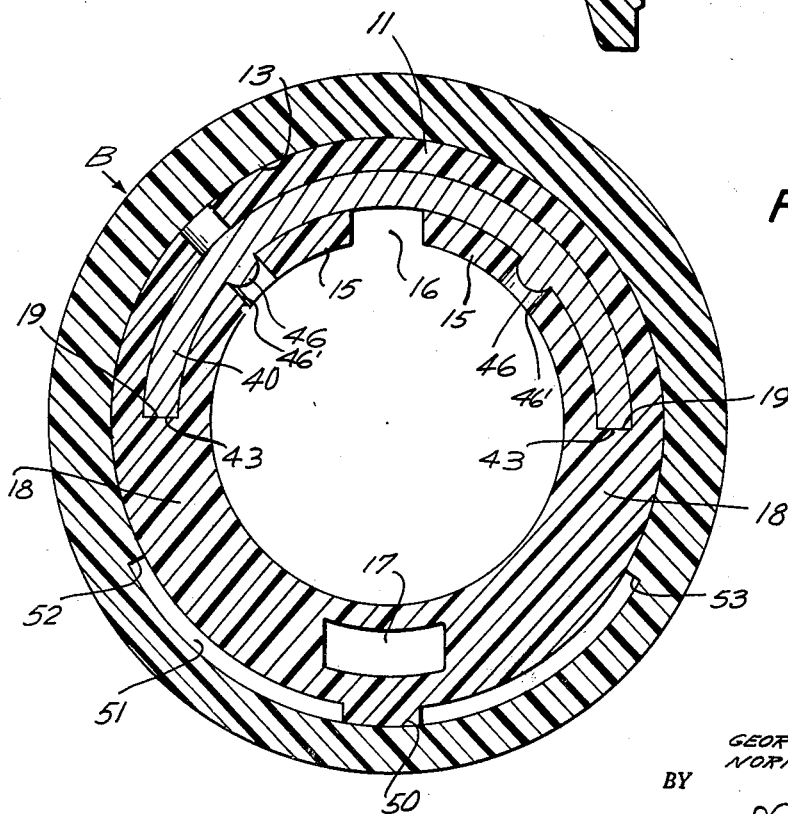
FIGURE 4 is a magnified section taken on the line 4—4 of FIGURE 3.
Figure 5:
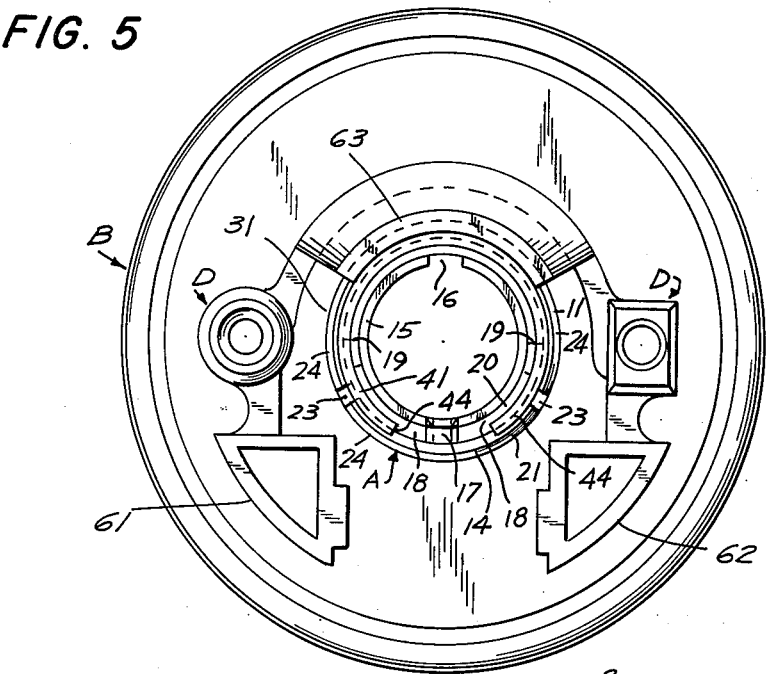
FIGURE 5 is an end elevation taken in the direction of the arrows 5—5 of FIGURE 3.

In the present retractor assembly it is desirable to limit the rotation of the knob component A with respect to the rose and support assembly B and for this purpose, a lug 50, extending peripherally beyond the shank 11 of the knob component A is provided (see FIGURE 4). The lug 50 rides in an arcuate groove 51, which communicates with the bearing aperture 13 in the rose B, the limiting walls 52, 53 which define the arcuate extent of said groove 51 providing limit stops for the said lug 50.

Support post elements 61, 62, formed as an extension of the rose plate component B, may be provided for mounting the latch bolt assembly in a manner well known to those skilled in the art, but we prefer the orienting posts more fully described in the co-pending application aforesaid. Similarly, the reinforcement member 63 provides a thrust bearing against which the tubular segment 41 may rotate during the operating cycle of the assembly.

It will be recognized that great economies in labor assembly costs may be effected through the use of the previously described retractor mechanism. Thus, in place of the staking, welding, bending or swaging operations and the like required by structures heretofore known, assembly of the device is effected by an initial axial insertion of the knob shank into the rose assembly and the subsequent axial insertion of the retractor member axially into the hollow shank of the knob assembly. Thus, also, the self-lubricating characteristics of the plastics, particularly nylon, to each other may be secured, with all adequate structural rigidity of assembly.

It will be further understood that the latch bolt actuator assembly has been illustrated in its simplest form and that additional lock functions may be incorporated within the said assembly. Thus, the retractor mechanism may be provided with a locking function, a privacy function or the like, which functions may take on various forms as will be understood by those skilled in the art.

Also, it will be observed that part of our invention contemplates that in installations where the inside and outside knobs need not be independently rotatable, the retractor component C may take the form of a single, particylindrical element of relatively rigid material as compared with the shank, extending through from the shank of the inside knob to the shank of the outside knob. In such a unit, the retractor need not be integrated permanently with either knob spindle assembly but optionally may be maintained in spanning relation between the spindle assemblies by the action of the draw bolts which secure the rose plates to the door. Similarly, the retractor may be secured to one knob spindle assembly and telescope into the shank of the other spindle of the other knob, the said retractor in each of the aforesaid instances serving the dual functions of reinforcing the inner spindle portions to prevent them from being removed from the rose plates and providing a driving connection with latch retractor mechanism.

In each form of retractor spindle C which is shown and described, where the knobs of the knobs are of the plastic or nylon, the member C is preferably made of rigid metal cooperating with the self-lubricating bearing of the shank and concentric sleeve 15 of resilient material to rigidify these parts against displacement by bending stresses which may be applied to the knobs in the usual use thereof.

Having thus described the invention and illustrated its use, what is claimed as new and is desired to be secured by Letters Patent is:

1. A knob and rose assembly comprising a rose having an axial bearing, a knob, a tubular shank on said knob providing a trunnion rotatably mounted in said bearing of said rose, inner and outer end thrust bearing means on said shank engaging the inside and outside faces, respectively, of said rose, said inside thrust bearing means being normally resiliently radially outwardly projected into end thrust engagement with said inside face of said rose, and a latch bolt retractor member secured to said shank, said retractor member including radial reinforcement means engaging said shank adjacent said inside end thrust bearing means to support the inside end thrust bearing means in said radially projected engagement.

2. A knob and rose assembly comprising a rose having an axial bearing, a knob, a tubular shank on said knob providing a trunnion rotatably mounted in said bearing of said rose, inner and outer end thrust bearing means on said shank engaging the inside and outside faces, respectively, of said rose, said inner thrust bearing means including a resilient end portion on said shank, shoulder means carried by said end portion and normally radially outwardly projected from the sides of said trunnion into end thrust engagement with said inside face of said rose, and a latch bolt retractor member sleeved within said shank, said retractor member including reinforcement means engaging said inside end portion of said shank to limit inward radial deflection of said resilient end portion.

3. An assembly in accordance with claim 2 wherein said end portion of said shank is longitudinally slotted and said reinforcement means are positioned radially inwardly of said end portion to hold said reinforcement means in keying engagement and retain said resilient end against displacement.

4. An assembly in accordance with claim 2 wherein said shank portion comprises resilient plastic and is provided with a transverse recess portion, and said retractor member includes a transverse detent member adapted to be inserted endwise into retaining engagement within said recess portion of said shank to hold said plastic against displacement of said projected end portions.

5. An assembly in accordance with claim 2 wherein said shank portion comprises resilient plastic and defines an internal annular channel portion, and said retractor member includes a barb portion irreversibly endwisely insertible into said channel.

6. An assembly in accordance with claim 5 wherein said shank is provided with a longitudinal slotted section outlining said resilient end portion and said retractor member includes a lug portion received in said slot to provide a keying driving connection between said shank portion and said retractor member.

7. A knob and rose assembly comprising a rose having inner thrust bearing and outer thrust bearing faces and an axial bearing extending between said faces, a knob having a tubular shank providing a trunnion rotatably mounted in said axial bearing of said rose, said shank including a resilient inner end portion, inner end thrust bearing means extending radially from said inner end portion of said shank and normally projected radially by said portion into end thrust engagement with said inner thrust bearing face of said rose, and a latch bolt retractor member secured within said end portion of said shank and said retractor member including stiffener means sleeved within said shank engaging said end portion of said shank to limit radial inward deflection thereof, whereby to maintain said inner end thrust bearing means radially and in inner thrust bearing contact with said inner thrust bearing face of the rose.

8. An assembly in accordance with claim 7 wherein said inner end portion of said shank is provided with a leading cam face adapted to co-act with said bearing of said rose to shift said inside thrust bearing means radially inward when said shank is advanced axially through said bearing from the outside face toward the inside face of said rose.

9. An assembly in accordance with claim 8 wherein said end portion of said shank is longitudinally slotted to divide the same into arcuate segments having spaces therebetween.

10. A knob and rose assembly comprising a rose having an axial bearing, a knob having a tubularly walled shank providing a trunnion rotatably mounted in said bearing, inside end thrust bearing means normally resiliently radially projected from the end portion of said shank into end thrust engagement with the inside face of said rose, endwisely open concentrically positioned socket means within the wall outlining said tubular shank of said knob, and latch bolt retractor means having complemental retainer means engaged within said socket means of said shank, and stiffener means engaging said end portion of said shank and limiting radial inward deflection of the wall defining said shank.

11. An assembly in accordance with claim 10 wherein said retractor means is insertible endwise into said shank and said retainer means comprises at least one barb portion.

12. An assembly in accordance with claim 10 wherein said shank comprises resilient plastic, and said retractor means is insertible endwise into said socket of said shank and includes at least one barb portion having a leading cam face and a trailing gripper point with respect to the direction of insertion of said retractor means into said socket.

13. An assembly in accordance with claim 10 wherein said shank comprises resilient plastic and the tubular wall outlining said socket includes a transverse keying recess portion, and said retainer means includes a transverse portion extending into said recess portion of the wall of said socket.

14. An assembly in accordance with claim 10 wherein said shank comprises resilient plastic and said socket is defined by spaced arcuate walls and said retainer means include at least one barb portion, the radial extent of which barb portion exceeds the radial spacing of said arcuate walls.

15. An assembly in accordance with claim 14 wherein one said arcuate wall is provided with a plurality of radial recesses and each said barb portion is extended into one of said recesses.

16. An assembly in accordance with claim 15 wherein said barb portions include cam faces in leading position with respect to said knob and gripper points in trailing position with respect to said knob.

17. An assembly in accordance with claim 15 wherein said stiffener means comprises a parti-annular portion.

18. An assembly in accordance with claim 17 wherein said shank and retractor means include key means coupling said retractor for rotation with said shank.

19. A knob and rose assembly including a rose having an axial bearing extending through from the inside to the outside faces thereof, end thrust shoulders formed on said faces of said rose adjacent said bearing, a knob member and a connected retractor member rotatably supported in said bearing, one of said members including a trunnion portion passing through said bearing and having retainer lugs normally and resiliently radially biased projected into end thrust engagement with one of said end thrust shoulders of said rose and deflectible therefrom during projection into said axial bearing, and the other of said members including a radial reinforcement portion secured within said trunnion portion radially inwardly of said retainer lugs restraining inward radial displacement.

References Cited in the file of this patent
UNITED STATES PATENTS

| | | |
|---|---|---|
| 2,059,319 | De Vries | Nov. 3, 1936 |
| 2,369,494 | Schlage | Feb. 13, 1945 |
| 2,676,049 | Wurzel | Apr. 20, 1954 |